F. S. & G. H. BALDWIN.
CALCULATING MACHINE.
APPLICATION FILED FEB. 24, 1915.
1,207,700.
Patented Dec. 12, 1916.
6 SHEETS—SHEET 1.
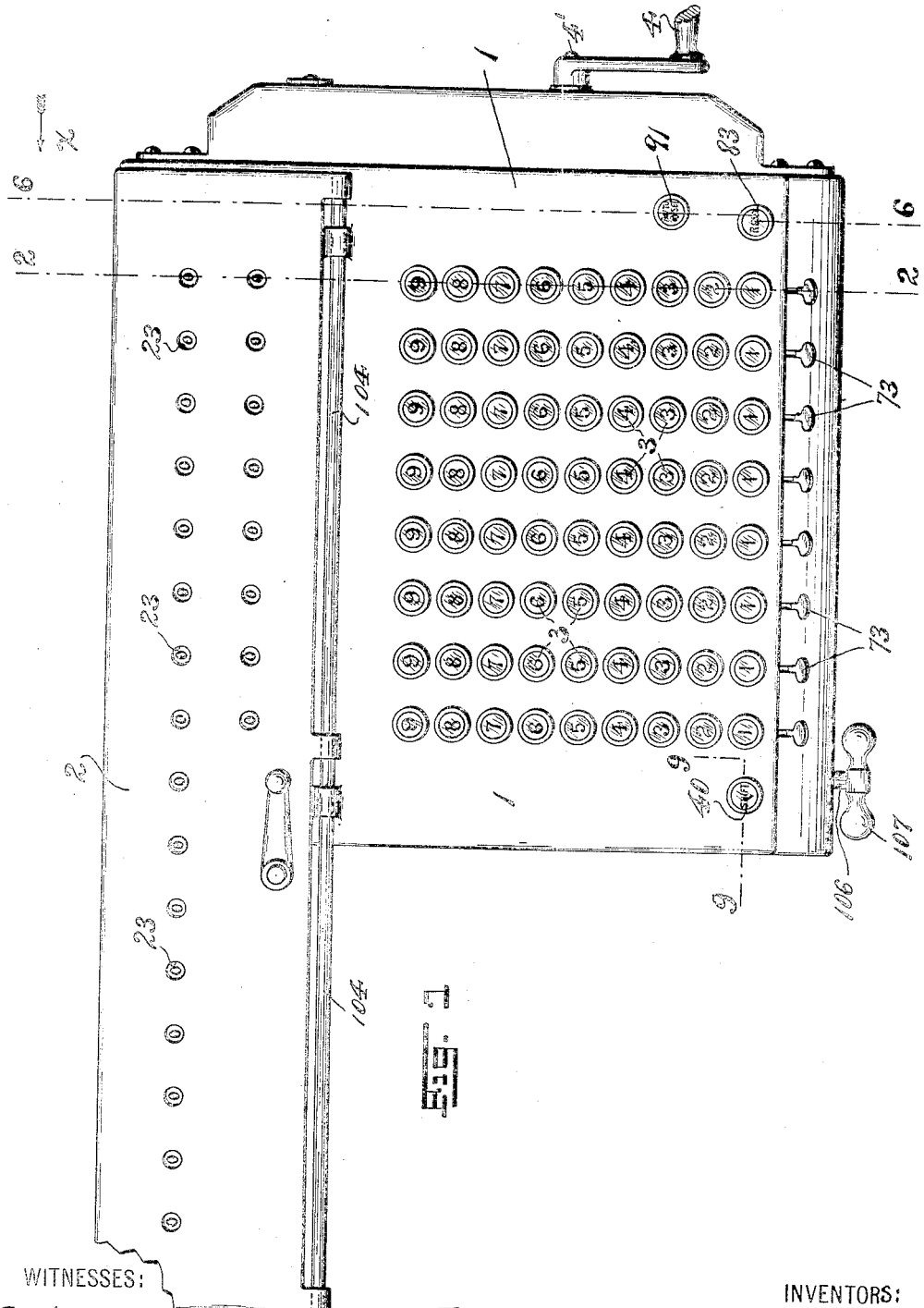
WITNESSES:
Fredk. W. Frautzel.
Eva E. Desch.
INVENTORS:
Frank S. Baldwin & George H. Baldwin,
BY
Frautzel & Richards,
ATTORNEYS

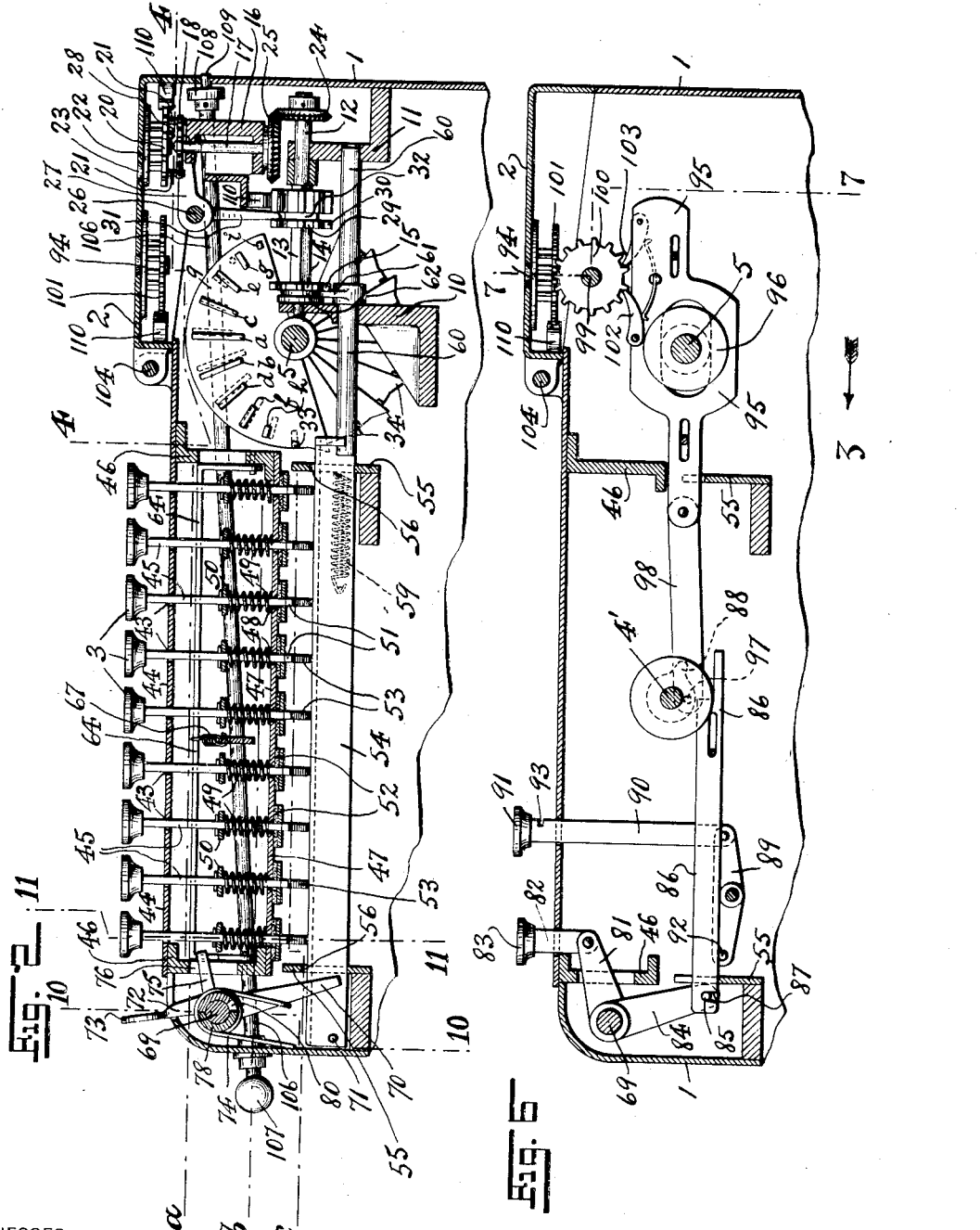

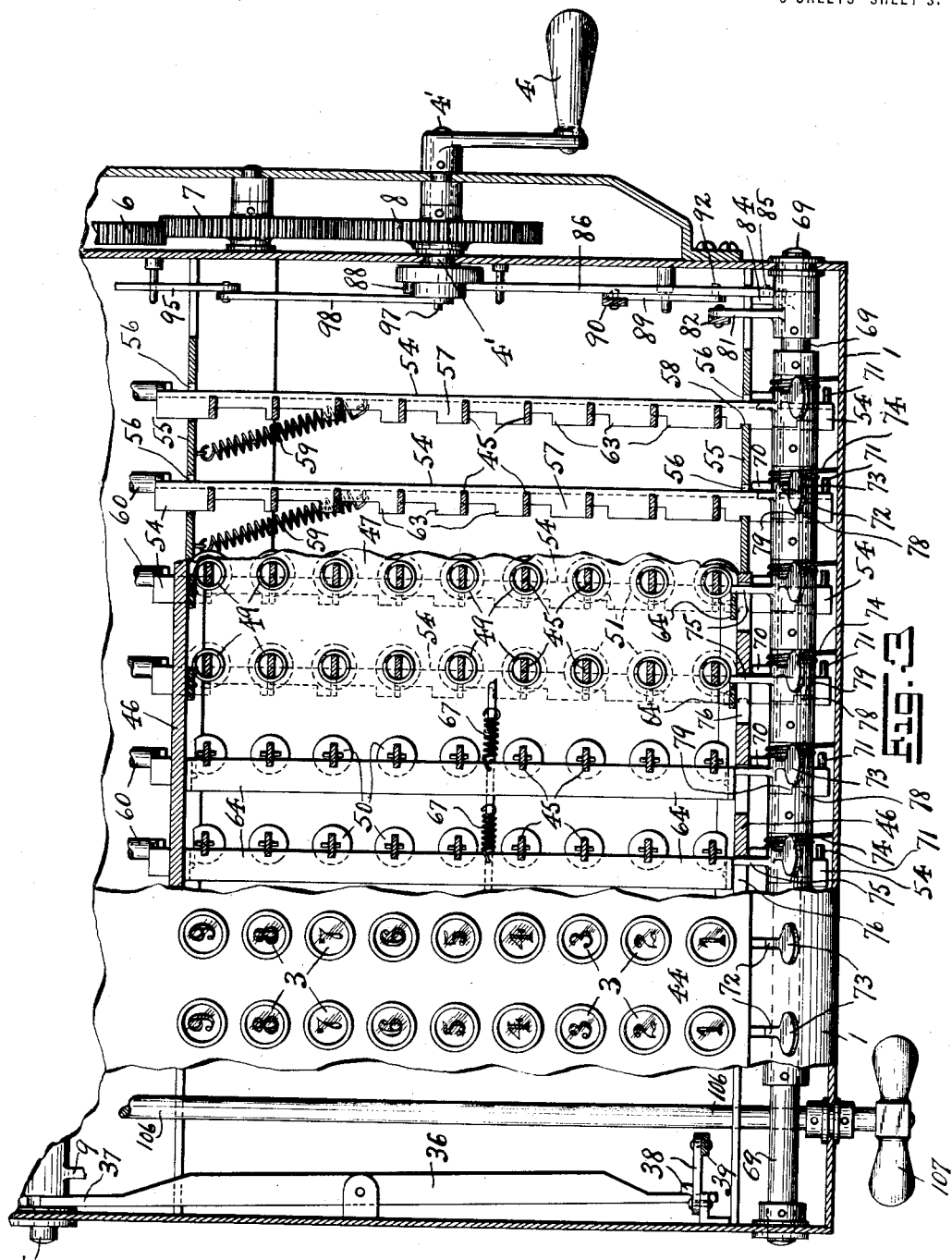

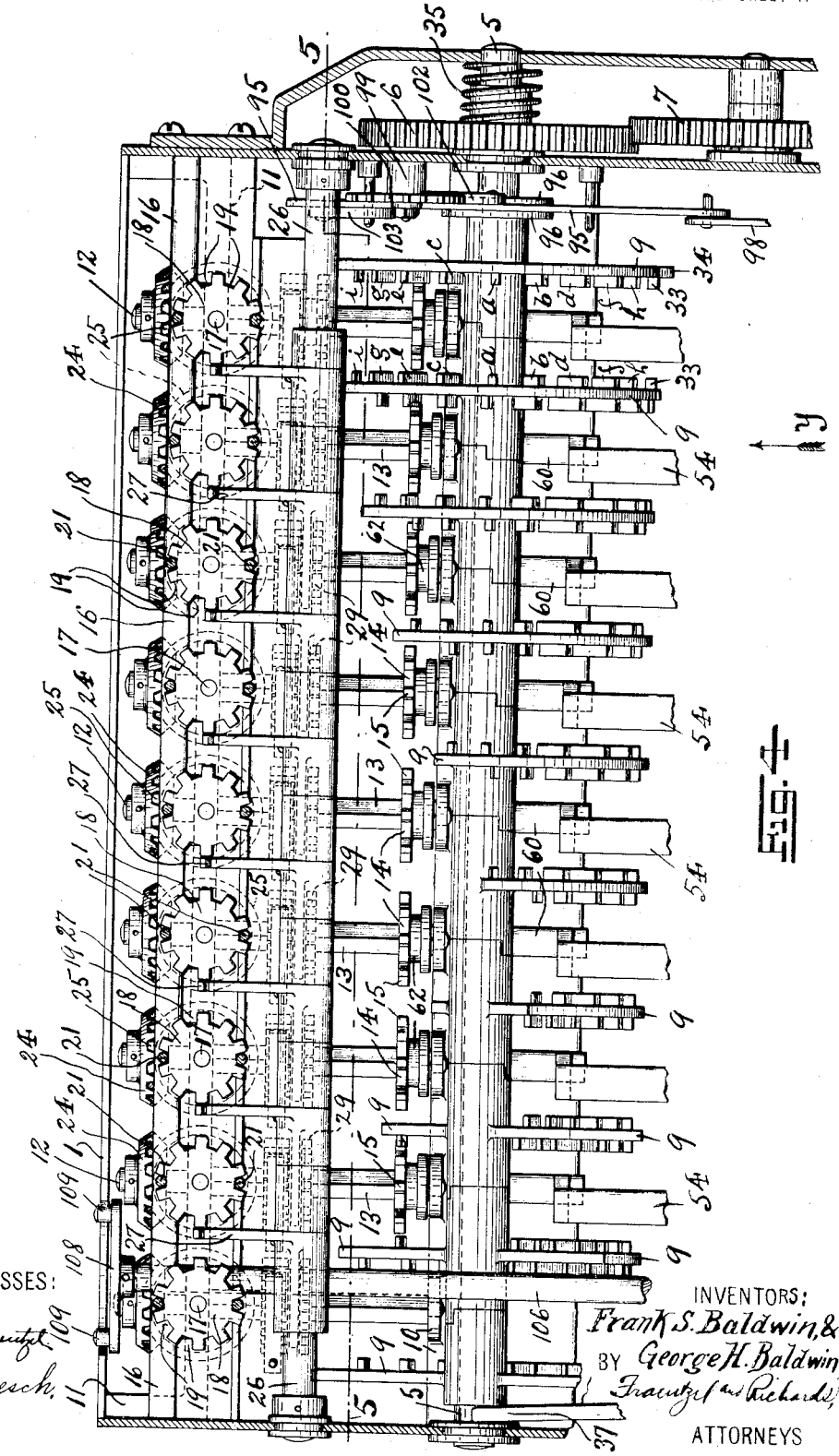

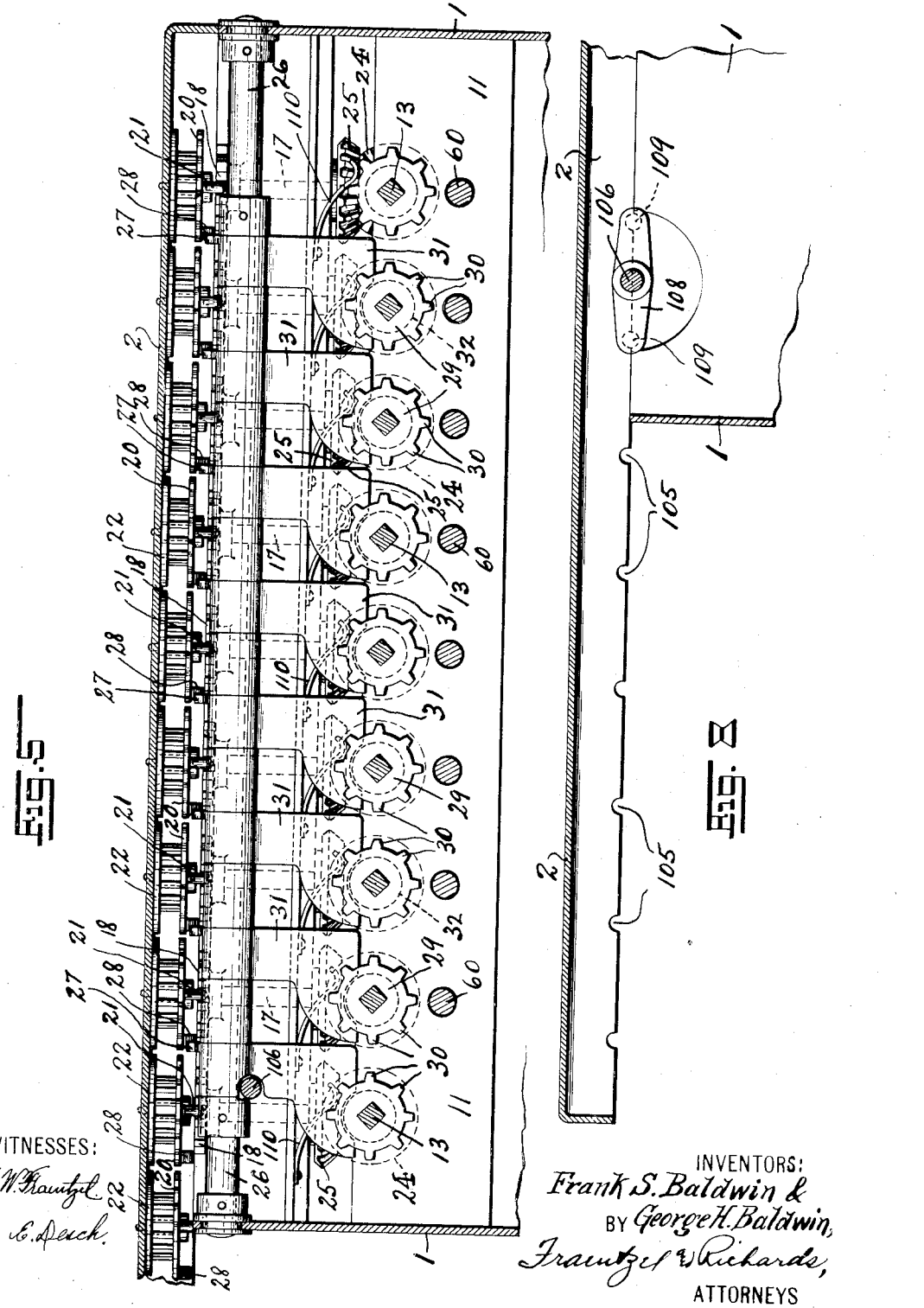

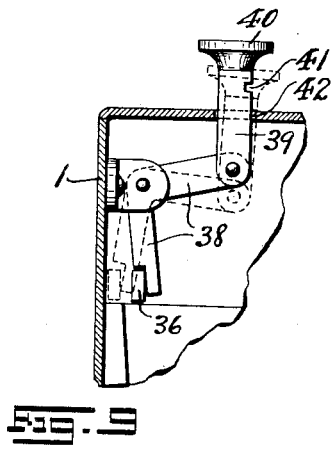
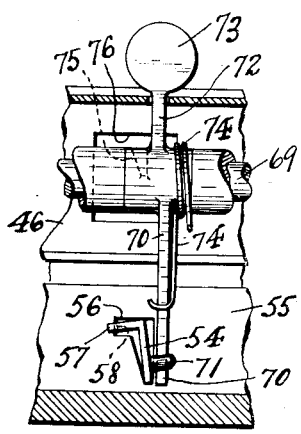
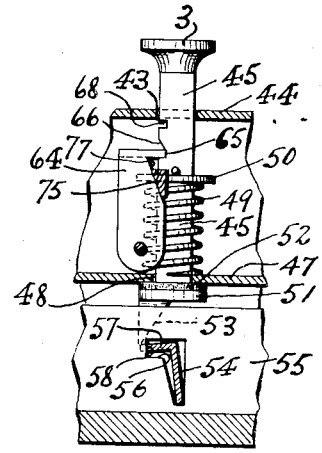
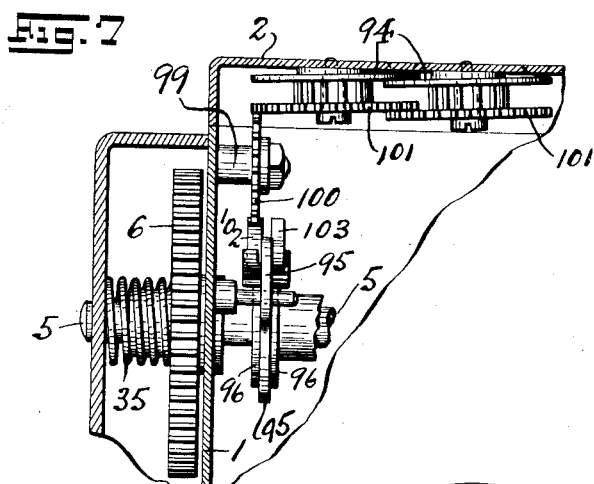
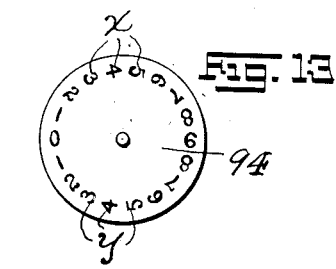
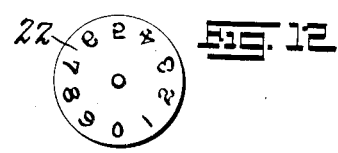
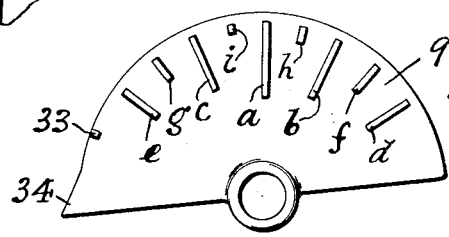

UNITED STATES PATENT OFFICE.

FRANK S. BALDWIN AND GEORGE H. BALDWIN, OF EAST ORANGE, NEW JERSEY.

CALCULATING-MACHINE.

1,207,700.	Specification of Letters Patent.	Patented Dec. 12, 1916.

Application filed February 24, 1915. Serial No. 10,216.

*To all whom it may concern:*

Be it known that we, FRANK S. BALDWIN and GEORGE H. BALDWIN, citizens of the United States, residing at East Orange, in the county of Essex and State of New Jersey, have invented certain new and useful Improvements in Calculating-Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference to improvements in calculating machines; and the said invention has for its principal object to provide a simplified and standardized improved mechanism for the rapid and easy accurate solution of problems involved in addition, subtraction, multiplication and division calculations.

In the accompanying drawings, Figure 1 is a top or exterior plan view of our novel calculating machine, made according to and embodying the principles of our present invention. Fig. 2 is a transverse section of the same taken on line 2—2 in said Fig. 1, looking in the direction of the arrow *x*. Fig. 3 is a horizontal section of the forward or key-board end of the machine, said section being taken at different planes as indicated by the section lines *a*, *b* and *c* in said Fig.
2. Fig. 4 is a horizontal section of the rearward or registering end of the machine, said section being taken on line 4—4 in said Fig. 2, said Fig. 4 being drawn on an enlarged scale. Fig. 5 is a longitudinal vertical section, taken on line 5—5 in said Fig. 4, looking in the direction of the arrow *y*, said view being a further illustration of the registering mechanism of the machine. Fig. 6 is a transverse section taken on line 6—6 in Fig. 1, also looking in the direction of the arrow *x*, said view illustrating in detail the automatic key-resetting or wipe-out mechanism and the transmission mechanism of the secondary registering wheels. Fig. 7 is a detail vertical section of the same mechanism, taken on line 7—7 in said Fig. 6, looking in the direction of the arrow *z*. Fig. 8 is a detail, longitudinal vertical section illustrating the carriage shifting means.
Fig. 9 is a detail vertical section taken on line 9—9 in said Fig. 1, and illustrating a portion of the setting means whereby the registering mechanism may be arranged for addition and multiplication, or subtraction and division calculations. Fig. 10 is a detail vertical longitudinal section, taken on line 10—10 in said Fig. 2, illustrating a detail of the slide-bar retracting or resetting means. Fig. 11 is a detail vertical longitudinal section, taken on line 11—11 in said Fig. 2, illustrating the relation of the operating keys to the slide-bars. Fig. 12 is a face view of an indicating wheel of the primary registering or calculating mechanism. Fig. 13 is a face view of an indicating wheel of the secondary registering mechanism. And Fig. 14 is a face view of a slightly modified form of a primary transmission disk or segment controlling the calculating movements of the primary registering or calculating mechanism.

Similar characters of reference are employed in all of the above described views to indicate corresponding parts.

In practising our present invention, a suitable inclosing casing 1 is provided, the same being preferably of a rectangular form, as shown in Fig. 1. The indicating mechanism, upon which the results of the calculations are registered is located within a movable carriage 2 located at the rear end of the casing, and this carriage is capable of an endwise movement for purposes subsequently described. Arranged conveniently in a location upon the forward part or end of the casing, so that the same project upwardly from the top of the casing, are the series of keys 3, by means of which the calculating mechanism is set for the desired calculation. Located at the right hand end of the machine is the crank-handle 4 by means of which the operating power is imparted to the calculating mechanism.

The calculating mechanism comprises a main shaft 5, which is journaled in the end walls of the casing so as to extend longitudinally through said casing. Fixed upon said shaft 5 is a gear-wheel 6 which meshes with an idler gear-wheel 7, which in turn meshes with a driving gear-wheel 8 fixed upon the crank-handle shaft 4', this arrangement of gears being such that one turn or revolution of said crank-handle 4 is transmitted therethrough so as to produce one complete turn or revolution of said main shaft 5. Fixed upon said main shaft 5 are a series of primary calculating disks or segments 9. Projecting from the left hand side or face of such calculating disk or segment 9 is a series of nine counting-teeth or projections and a carrying-tooth or projection, the same extending at right angles to the side or face of said calculating disk or segment 9. These counting-teeth or projections extend radially with relation to the axis of said calculating disk or segment 9, and vary in length for purposes subsequently to be set forth. In like manner projecting from the right hand side or face of each calculating disk or segment 9 is another series of nine counting-teeth or projections and a carrying-tooth or projection of the same construction and arrangement. The counting-teeth or projections on the left hand side or face of each calculating disk or segment are adapted for use in making calculations of addition and multiplication, while the counting-teeth or projections on the right hand side or face of each calculating disk or segment are adapted for use in making calculations of subtraction and division.

The reference characters 10 and 11 indicate suitable angle irons or bracket-members which are suitably located to extend longitudinally through the interior of the casing, and the same serve to provide bearings in which are journaled a number of transmission shafts 12, which extend transversely toward the rear side of said casing. A portion 13 of said transmission shafts 12 is square or polygonal in cross-section. Mounted upon said square portions 13 of said transmission shafts are secondary toothed calculating wheels 14, the rotation of which is imparted to said transmission shafts, the same being capable of a longitudinal sliding movement on said square portions 13. The said transmission shafts and their secondary calculating wheels are positioned so as to intervene between the faces or sides of adjacent primary calculating disks or segments 9, so that said secondary calculating wheels may be engaged as desired either by the addition and multiplication counting-teeth or the subtraction and division counting-teeth according to the calculation desired. The said secondary calculating wheels are each provided with eight teeth 15, such number of teeth permitting sufficient separation of the teeth one from another as will provide a proper and sufficient clearance between the same and the counting-teeth of the primary calculating disks or segments 9, a wider separation of or clearance between said teeth being necessary since the counting-teeth of the primary calculating disks or segments are arranged and operate in engagement with the teeth of said secondary calculating wheels in a plane at right angles to the line of rotation of said secondary calculating wheels. When in normal position said secondary toothed calculating wheels are located upon said transmission shafts toward the axis of said primary calculating disk or segments and out of the path of movement of the counting-teeth of the latter. By means of devices subsequently to be described, said secondary calculating wheels may be moved to proper positions upon said transmission shafts so that the same may be engaged and operated by any desired number of said counting-teeth of said primary calculating disks or segments 9. The arrangement of said counting-teeth upon said primary calculating disks or segments whereby one or more may be caused to actuate said secondary calculating wheels is as follows:—The counting-teeth or projection $a$, in its radial extent is the longest, the counting tooth or projection $b$, is one degree shorter than $a$, $c$ is one degree shorter than $b$, $d$ is one degree shorter than $c$, $e$ is one degree shorter than $d$, and so on, to wit, $f$ is shorter than $e$, $g$ is shorter than $f$, $h$ is shorter than $g$, and $i$ is shorter than $h$. The outer ends of the various counting-teeth or projections thus formed are alined together at equal distances from the axis of the primary calculating disks or segments, but their inner ends at varying distances from the axis of the same, and consequently the secondary calculating wheels when moved outward may be brought into the path of one or more of said counting-teeth or projections. For example if it is desired to actuate said secondary calculating wheel to count one unit, the same is moved into the path of the inner end of the counting-tooth or projection $a$, so that when the primary calculating disk or segment is rotated the counting-tooth or projection $a$ alone engages and moves said secondary calculating wheel, the remaining counting-teeth or projections all being shorter, the same pass by and beyond the toothed periphery of said secondary calculating wheel. If it is desired to actuate said secondary calculating wheel to count three units, the same is moved farther along on the transmission shaft until it is positioned in the path of the inner end of the counting-tooth or projection $c$, so that when the primary calculating disk or segment is rotated the counting-teeth or projections $a$, $b$ and $c$ engage and move said secondary calculating wheel to produce three calculating impulses or movements thereof, the remaining counting-teeth or projections being beyond the position of said secondary calculating wheel pass the same without effect.

The several counting-teeth or projections $a$, $b$, $c$, etc., may be positioned relatively to each other in any relation, and it is not necessary that they should be related so as to follow each other successively according to their numerical value or length reduction. As shown in Fig. 2, the counting-tooth or projection *a* is centrally arranged with the counting-teeth or projections having odd numerical value on one side and those having even numerical value on the other side of the same, while in Fig. 14 another relative disposition of such counting-teeth or projections is shown.

The reference character 16 indicates a suitable bracket-member which is mounted within said casing so as to extend, in proper location, longitudinally through the interior thereof, the same serving to provide bearings for a series of vertical spindles 17. Secured upon the upper end of each spindle 17 is a transmission wheel 18 provided in its periphery with a series of ten notches 19. Rotatably mounted in said carriage 2 are a series of primary registering wheels 20, from the lower side or face of which project a pair of coupling-pins 21, which when said carriage 2 is lowered to normal position seat themselves in opposite notches 19 of said transmission-wheels 18, thereby coupling said transmission-wheels 18 to said registering-wheels 20, so that the calculating movements imparted to the former are transmitted to the latter. Each registering-wheel 20 is provided with a dial-plate 22 bearing thereon the numeral characters 1 to 0, and which are registered beneath the openings 23 in said carriage 2 so as to be visible therethrough, and thus indicate the result of the calculation made. Of course, the said registering-wheels and the transmission wheels are arranged to make ten unit movements per revolution thereof, in order to provide the necessary movement to effect the decimal system of calculation. These unit movements of the registering-wheels correspond to and with the unit movements of said secondary calculating wheels 14, but since the latter possess but eight teeth 15, and consequently make but eight unit movements per revolution, it is necessary to provide an intermediate gearing between said transmission shafts and spindles 17 of a four to five ratio in order to transform the rotation of the secondary calculating wheels to the necessary decimal movement of the registering-wheels. We therefore employ a twelve toothed bevel gear 24 fixed upon each of said transmission shafts, the same meshing with a fifteen toothed bevel gear 25 which is fixed upon the lower end of each of said spindles 17. If desired the gear 24 may be provided with sixteen teeth and the gear 25 with twenty teeth, or said gears may be respectively provided with any other number of teeth providing an equivalent geared ratio.

As is well known in this art it is necessary to provide a carrying mechanism between the several registering-wheels; that is to say, from unit wheel to tens, from tens to hundreds, and so on throughout the series of registering wheels of the registering mechanism. In our present invention this carrying mechanism is of novel construction and operation and comprises a longitudinally extending fulcrum shaft 26 upon which are pivotally mounted a series of bell-crank lever devices each provided with a rearwardly extending lever-arm 27 the free ends of which are positioned beneath the marginal edges of the registering wheels 20. Each registering-wheel 20 is provided adjacent to its circumference with a downwardly depending trip-nosing 28 adapted to be carried by the rotation of said registering-wheels into actuating engagement with the end of said lever-arms 27. Said trip-nosings 28 are so located as to function when said registering-wheels are moved from their "nine" registering or indicating position to their "zero" registering or indicating position. Arranged upon the square-portion 13 of the transmission shafts 12, excepting the transmission shaft for the unit registering-wheel, are carrying-wheels 29 provided with eight teeth 30, wherein the same correspond in structure to said transmission-wheels 14. The downwardly extending lever-arm 31 of the bell-crank devices is arranged to engage said carrying-wheels, in such a manner that the lever-arm of the bell-crank device operated by the unit registering-wheel will engage with the carrying-wheel on the transmission-shaft operating the tens registering-wheel, and so on throughout the series. To this end we have found it convenient to provide each carrying-wheel 29 with an annular groove 32 in which is received the free end of the downwardly extending lever-arm 31 of the bell-crank device desired to be operatively associated therewith. When, for example, the number of units to be registered upon the unit registering-wheel exceeds "nine" the trip-nosing 28 thereof is carried into engagement with the free end of said lever-arm 27 of a bell-crank device thereby causing a downward swing or oscillation of the same which turns said bell-crank device on its fulcrum and swings forward the lever-arm 31 thereof. This movement slides forward the carrying-wheel on the next adjacent transmission shaft, in the example the "tens" transmission shaft, and positions the same in the path of movement of the carrying-tooth or projection 33 provided on the "tens" primary calculating disk or segment, so that a rotation of the latter causes the carrying-tooth to give such carrying-wheel and its transmission shaft a unit movement which of course is transmitted to and registered by the "tens" registering-wheel. The carrying-teeth or projections 33 with which the primary calculating disks or segments are provided are positioned with relation to the counting-teeth or projections thereof so that their path of movement does not coincide with the path of movement of any of said counting-teeth or projections, but is beyond or farther away from the axis of said primary calculating disks or segments, and thus capable of operation only in connection with said carrying-wheels.

In order to provide a proper time relation as to the operative movements of the series of primary calculating disks or segments, the same are positioned relatively upon the main shaft 5 so as to be set back from each other, that is the "tens" disk or segment is set back with relation to the "units" disk or segment, the "hundreds" disk or segment is set back with relation to the "tens" disk or segment, and so on throughout the series. This arrangement assures a better balance in the operation of the registering mechanism, eliminating undue jars and shocks, and at the same time so positions the carrying teeth or projections of the several disks or segments, that they will follow each other in operation, and prevent the actuation of a registering-wheel by one from interfering in anyway with the actuation of a registering wheel by another, or with the ordinary actuation of any other registering-wheel by the counting-teeth or projections of other disks or segments. In order to return said carrying-wheels, and the bell-crank devices connected therewith, to normal initial positions after their operation, each primary calculating disk or segment is provided on its circumference with a properly positioned cam-member 34 which is adapted, at the end of the operative movements of the disks or segments, to engage the outwardly swung lever-arm 31 and push the same back to normal position, whereby the carrying-wheels as well as the other lever-arm 27 are also returned to their normal initial positions. It will be understood that the spring 110 by its pressure upon the carrying-wheels holds the same not only against over rotation by momentum, but also holds the same in either laterally moved position effected by the lever-arms 31.

The main shaft 5, upon which the primary calculating disks or segments 9 are fixed, is capable of a slight longitudinal movement in its bearings. Normally said main shaft 5 is maintained moved to the left by means of a spring-member 35. When in this position the said primary calculating disks or segments 9 thereon are so located as to maintain the counting-teeth of the left hand side or face of said primary calculating disks or segments in operative relation to said secondary calculating wheels 14 so that the operations effecting calculations of addition and multiplication may be accomplished, since the operative engagement of said counting-teeth turn said secondary calculating wheels in one direction; when the main shaft 5 is moved to the right, the primary calculating disks or segments 9 are moved to the right, thus removing the adding or multiplying counting-teeth from operative relation to said secondary calculating wheels 14 and carrying into operative relation to said secondary calculating wheels 14 the counting-teeth on the right hand side or face of said primary calculating disks or segments so that operations effecting calculations of subtraction and division may be accomplished, since the operative engagement of the latter counting-teeth turn said secondary calculating wheels 14 in the opposite direction. The means for shifting said main shaft to thus provide for the making of calculations of subtraction and division instead of addition and multiplication comprises a shift-lever 36 pivoted in a suitable location within the casing 1 with its free end 37 in operative engagement with the end hub of the last primary calculating disk or segment 9. The opposite end of said shift-lever 36 is operatively engaged by one arm of a bell-crank lever 38 also pivoted in a suitable location within the casing. The opposite arm of said bell-crank lever 38 is connected with the shank 39 of a push-button 40, said shank 39 extending through a suitable opening in the top wall of said casing, and said shank 39 being further provided with a notch or cutaway portion 41 adapted to be engaged with the marginal edge 42 of said opening when said push-button is depressed to thereby lock said bell-crank lever in its operated position and consequently locking said shift-lever in position to hold said main shaft 5 and the primary calculating disks or segments 9 moved to the position for effecting the calculations of subtraction and division. The means for adjusting or positioning said secondary calculating wheels 14 in proper relation to said primary calculating disks or segments 9 to effect the desired calculation comprises the rows of keys 3. These keys, as shown in Fig. 1, are arranged in parallel series or banks. There are eight banks or series, though there may be more or less than this number of key banks without departing from the scope of our present invention. The keys of each bank or series are numbered from 1 to 9. The means for mounting said keys 3 comprises a series of openings 43 in the top-wall 44 of said casing, through which the shanks 45 of said keys 3 are inserted. Supported by a pair of longitudinally extending bracket-irons 46 fixed within said casing, so as to be registered beneath and properly spaced from said top-wall 44, is a guide-plate 47 also provided with a series of openings 48 corresponding to and registering beneath the openings 43 of said top-wall, and through which the key-shanks 45 pass, thus properly supporting said keys for their operative vertical movements. Said keys 3 are maintained in their upwardly thrust or normal positions by means of spring-members 49 seated upon said guide-plate and thrusting against a washer 50 pinned in fixed relation to each key-shank. The lower end of each key-shank is provided with a stop-shoulder 51 upon which is seated a felt-cushion 52, or other equivalent means, which permit said stop-shoulders to be brought in noiseless stopping engagement with the under side of said guide-plate 47. The lower extremity of each key-shank 45, beneath its stop-shoulder, is provided with a cam-nosing 53.

Arranged beneath each bank of keys 3 is a transversely extending slide-bar 54, these slide-bars being supported by carrier-plates 55 fixed within said casing 1 so as to extend longitudinally therein, said carrier-plates are provided with suitable registered openings or hatches 56 in which the ends of said slide-bars are movably supported. Each slide-bar is of angular cross section having a substantially horizontal portion 57. Each slide-bar is capable of a slight lateral rocking-movement in its openings or hatches 56, and the same are locked in their normal position by means of a notch or cutaway portion 58 formed in and properly located in the free marginal edge of its horizontal portion 57, said notch or cutaway portion 58 being adapted to straddle and engage the marginal edge of the opening or hatch 56 of one of said carrier-plates 55, when said slide-bar is rocked forward. Each slide-bar is normally retained in such forwardly rocked position by means of a pull-spring 59 which is connected between said slide-bar and the opposite carrier-plate, and which is obliquely disposed with relation to said slide-bar, so that it not only effects the desired forward rocking-movement, but also causes the forward sliding movement of the slide-bar when the latter is released by the key operation, as will be subsequently described. Slidably supported in and extending transversely between said angle-irons 10 and 11, and in alinement with and beneath said transmission shafts 12, are a series of transverse slide-rods 60. Said slide-rods 60 are in alinement with and coupled to said slide-bars 54, by any suitable coupling devices, so that the longitudinal sliding movement of the latter is communicated to the former. Secured upon each slide-rod 60 is an upwardly extending push-arm 61, the free end of which operatively engages a secondary calculating wheel 14, by entering an annular groove 62 formed in the hubs of the latter, so that any longitudinal movement of said slide-rods 60 as induced by the operation of said slide-bars 54 is likewise communicated to said secondary calculating wheels 14, whereby the latter may be positioned in desired operative relation to the counting-teeth of said primary calculating disks or segments 9.

The horizontal portion 57 of each slide-bar 54 is provided in the free marginal edge thereof with a series of nine variously and progressively sized cutaway portions or notches the outward or forward ends of which provide a series of stop-shoulders 63, one for each key 3 in the bank operating each slide-bar. The stop-shoulder adapted to be engaged by the key marked "1" in each bank is so spaced therefrom, when the slide-bar is in normal position, as to allow a rearward sliding movement of the slide-bars 54 one degree; the stop-shoulder adapted to be engaged by the key marked "2" in each bank is so spaced therefrom, when the slide-bar is in normal position, as to allow, a rearward sliding movement of the slide-bars 54 two degrees; and so on throughout the series of keys in each bank, the stop-shoulders being spaced relatively to each key so that the movement permitted to the slide-bars corresponds in degree to the numerical value of the key against which the particular stop-shoulder is brought to rest. In operation the desired key 3 is depressed, with the effect of carrying the cam-nosing 35 of that key into contact with the slide-bar beneath it, so that the inclined or chamfered edge of the cam-nosing 53, in moving against the slide-bar causes a lateral rearward rocking movement of the slide-bar which removes its locking notch or cutaway portion 58 from its locking or holding engagement, thus freeing said slide-bar to the pulling influence of its pull-spring 59, whereupon said slide-bar moves rearward until the stop-shoulder 63 corresponding to the key depressed comes in contact with the cam-nosing 53, thus stopping the further movement of the slide-bar, and thereby through the interconnecting or coupling parts carrying the corresponding secondary calculating wheel 14 into proper position to be actuated by the desired number of counting-teeth of the corresponding primary calculating disk or segment, which number of counting-teeth corresponds with the numerical designation of the key depressed. In this manner each secondary calculating wheel in the series is controlled and positioned by its corresponding slide-bar and bank of keys for operating the latter. Associated with each bank or series of keys 3 is a locking bar 64, the same being pivotally mounted between said bracket-irons 46 so as to extend transversely across the edges of said key-shanks, and so as to be capable of a swinging movement toward and away from said key-shanks. Each key-shank is provided with a cutaway-portion 65, the upper marginal edge of which provides a chamfered or cam-like portion 66. Normally the contacting marginal edge of said locking-bar 64 rests in said cutaway-portion 65, but when any key of the bank or series, with which the locking-bar is associated, is depressed, the chamfered or cam-like portion 66 of that key is carried into operative engagement with the said locking-bar, and the latter is rocked on its pivots away from the key-shank, and against the tension of an actuating spring 67 with which each locking-bar is provided, so as to permit the key to make its downward movement, and when the limit of such downward movement is reached, a holding-notch 68, which is formed in the edge of each key-shank, is registered with the locking-bar, the edge of which is caused to enter said holding-notch under the pull of said actuating-spring 67, thereby locking or holding said key depressed until said locking-bar is released from locking position, and consequently maintaining said depressed key in the desired operative relation to the slide-bar actuated thereby.

The releasing mechanism for releasing the depressed keys for return to normal position, and for returning the slide-bars 54 and the secondary calculating wheels controlled thereby to normal position after the desired calculation has been effected comprises the following mechanism. Journaled in the forward part of the casing, so as to extend longitudinally therein is a shaft 69. Mounted loosely upon said shaft, so as to be capable of individual oscillation thereon, are a series of resetting-levers, the lower-arms 70 of which are so disposed as to be carried into operative contact or engagement with a pin or lug 71 with which the forward end of each slide-bar 54 is provided. The upper arms 72 of said resetting-levers project through openings in the casing so as to be exteriorly disposed, and their exterior ends are provided with suitable finger-pieces 73. A coil-spring 74 associated with each resetting-lever maintains and returns the latter to their normal positions after actuation. Projecting inwardly from the hub of each resetting-lever is a trip-arm 75, the free ends of which extend through suitable openings 76 formed in the adjacent bracket-iron 46 so as to operatively engage a cam-portion 77 formed in connection with each locking-bar 64. By properly manipulating the finger-piece of any resetting-lever its lower-arm 70 may be carried into engagement with the pin or lug 71 of the corresponding slide-bar 54 so that the oscillation of said resetting-lever moves said slide-bar 54 from any actuated position back to normal initial position with its locking-notch 58 again in holding relation to the carrier-plate 55 as above described. Simultaneous to their operation and effected by the same oscillation of said resetting-lever the trip-arm 75 is oscillated against the cam-portion 77 of the corresponding locking-bar 64 with the effect of swinging the latter out of the holding-notch 68 of a depressed key 3, whereby its spring may return said depressed key to normal initial position. The said resetting-levers are so mounted on their shaft so as to be capable of individual and independent operation, consequently any mistake in setting up a number on the key board by depressing a wrong key may be easily and quickly corrected. It is also provided that all said resetting-levers may be operated simultaneously by the operator by a single operation, and to this end the said shaft 69 is provided with a series of male-clutch members 78, which are fixed upon said shaft so as to turn therewith. The hub of each resetting-lever is provided at the end adjacent to a corresponding male-clutch member 78 with a female-clutch 79 with which the male-clutch member operatively engages so that when said shaft 69 is turned or rocked all the resetting-levers are simultaneously oscillated. There is sufficient play between the male-clutch portions and the female-clutch portions to permit of the independent movement of the resetting-levers as above described, this play being permitted by reason of the space 80 between the male and female clutch portions, as shown more particularly in Fig. 2 of the drawings. Fixed upon said shaft 69 is a lever-arm 81 with the free end of which is connected a key-shank 82, the latter projecting through the casing and having on its exterior end the master resetting-key 83, the depression of which causes the simultaneous operation of all of the resetting-levers.

When the machine is used for purposes of calculations by simple addition or subtraction, for example, when it is desired to list or add up a series of different numbers, it is desirable to automatically reset the slide-bars 54, and keys 3, as each number is registered. To this end we provide the following means:—Fixed upon said shaft 69 is a lever-arm 84 connected with the free end of which is a laterally projecting pin or lug 85. Slidably supported within said casing is a transverse reciprocating-bar 86 one end of which is provided with a slot or cutaway portion 87 adapted to straddle said pin or lug 85 of the lever-arm 84, whereby said reciprocating-bar is operatively coupled with the latter. Mounted upon the inner end of said crank-handle shaft 4' is a rotary-cam 88, which once in every turn of the crank-handle 4, is carried operatively against the opposite end of said reciprocating-bar 86, thereby causing a movement of the latter which is communicated to said lever-arm 84, the oscillation of which in turn oscillates said shaft 69 to operate said resetting-levers through the said male and female clutch portions, thus automatically resetting the keys, etc., at the end of each turn of the crank-handle 4 whereby the calculating and registering mechanism is operated. When it is not desired to make use of such automatic resetting means, as when multiplying or dividing the reciprocating-bar 86 may be lifted from its coupled relation with the lever-arm 84 by means of the lift-lever 89 which is pivoted within the casing, and to one end of which is connected a key-shank 90 which projects exteriorly of said casing, and which possesses the operating key 91. The opposite end of said lift-lever 89 is provided with a pin or lug 92 which passes beneath said reciprocating-bar 86, and when said lift-lever is oscillated by the depression of the key 91, the said pin or lug is carried into lifting engagement with said reciprocating-bar 86 whereby its end is lifted off of the pin or lug 85 of the lever-arm 84. Said key 91 may be locked in its depressed position by means of a locking-notch 93 formed in its shank 90 which is caused to straddle the marginal edge of the casing opening through which said shank projects. Of course, it will be understood that any other suitable means for engaging and disengaging the reciprocating-bar 86 from its operative coupled relation to said lever-arm 84 may be employed, and that we therefore do not confine ourselves to the particular means above described.

In addition to the series of registering-wheels 20 upon which is registered the calculation, we provide a second series of registering wheels 94 which are located in the carriage 2, and these wheels are for the purpose of registering the number of turns of the main shaft 5, as effected by the crank-handle 4, in each position of the shifting case or carriage 2, and are useful only for multiplication showing the multiplier, and in division showing the quotient. The operating mechanism for these secondary registering wheels 94 comprises a reciprocating-member 95 which is mounted between the shoulders of a grooved collar 96 fixed upon said main shaft 5. This reciprocating-member 95 is connected with a crank-pin 97 operated by said crank-handle shaft 4' by means of a connecting-link 98, so that each turn of the crank-handle 4 produces a reciprocation of said reciprocating-member 95. Mounted rotatably upon a stud 99, so as to be conveniently located adjacent to said reciprocating-member, is a gear-wheel 100. Each registering-wheel 94 is provided with a gear-wheel 101, and these gear-wheels 101 are selectively meshed with said gear-wheel 100 according to the position of the carriage or case 2 in which said registering-wheels are carried. Mounted upon one side or face of said reciprocating-member 95 is a spring-pressed pawl 102, which, when said main shaft 5 is positioned to arrange its primary calculating disks or segments 9 for calculations in multiplication, engages the teeth of said gear-wheel 100 and causes an intermittent rotation of the same in one direction with each reciprocation of the reciprocating member 95, thereby registering with said secondary registering-wheels the number of rotations or turns of the crank-handle 4 in each position of the case or carriage 2. When, however, the main shaft 5 is shifted to arrange its primary calculating disks or segments 9 for calculations in division, the said reciprocating member 95 is likewise shifted laterally to disengage said pawl 102 from the gear-wheel 100, and to carry into engagement with said gear-wheel 100, an oppositely directed spring-pressed pawl 103, which is mounted upon the opposite side or face of said reciprocating-member 95, and which, when reciprocated with said reciprocating-member 95, causes an intermittent rotation of the gear-wheel 100 in an opposite direction, which opposite rotation of the gear-wheel 100 is transmitted through the gear-wheels 101 to the secondary registering wheels to rotate them in the opposite direction, whereby the number of turns of said main shaft and crank-handle are registered during calculations in division. Each registering-wheel 94 is provided or inscribed on its face with oppositely extending numerals 0 to 9, the set $x$ being disclosed by turning the registering-wheels in one direction when registering calculations in multiplication, and the set $y$ being disclosed by turning the registering-wheels in the opposite direction when registering calculations in division. These sets of numerals may also be distinguished by different colors if desired.

The operation of multiplication and division are performed by shifting the case or carriage 2 carrying the registering mechanism from place to place, as is usual in machines of this class. In the present instance the carriage 2 is mounted pivotally upon the longitudinally extending rod 104, which is supported upon the upper wall of the casing 1, and in addition to its pivotal relation thereto said carriage is also capable of a longitudinal or endwise movement upon said rod 104. The carriage 2 is lifted so as to disengage the coupling-pins 21 from the transmission wheels 18, whereupon the carriage 2 may be moved to shift the registering wheels and again engage or couple the same with the transmission wheels 18, according to whether the calculation is in units, tens, hundreds, thousands, etc. The free or lower marginal edge of the rear wall of said carriage 2 is provided with a series of equidistant notches 105, the distance between which determines the step by step movement or shift of the carriage. Rotatably mounted within said casing 1 is a transverse shaft 106, the forward end of which projects exteriorly of the casing 1, and is provided with a handle 107 for rotating the same. Secured upon the opposite end of said shaft 106 is a shifting lever 108 comprising a pair of oppositely extending arms provided at their ends with outwardly projecting pins 109 which engage adjacent notches 105. When said shaft 106 is given a half turn or rotation, which causes a half turn or rotation of the shifting-lever 108, one of the pins 109 describes an arc which both lifts said carriage 2 and propels the same forward to its next position, according to the direction of movement desired. Turning the shaft 106 to the right shifts the carriage 2 to the right, and turning the shaft 106 to the left shifts the carriage to the left. To prevent the throwing over or throwing past the desired position of the primary and secondary registering wheels and of the secondary calculating wheels, there is provided for each wheel a separate light leaf-spring 110 which engages the teeth of these wheels and arrests their momentum.

The means for resetting or wiping out the calculations registered upon the registering wheels is not shown, since it forms no part of the present invention, but means for that purpose such as is shown in the previous Letters Patent #890,888, of June 16, 1908 granted to Frank S. Baldwin, one of the present inventors, may be used in our present machine.

We are aware that some changes may be made in the arrangements and combinations of the parts, as well as in the details of the construction of the same, without departing from the scope of our present invention as described in the foregoing specification, and as defined in the claims appended hereto. Hence, we do not limit our invention to the exact arrangements and combinations of said parts as hereinabove described, nor do we confine ourselves to the exact details thereof as illustrated in the accompanying drawings.

We claim:—

1. A calculating machine, comprising a registering mechanism including a set of numeral or registering wheels having a decimal movement, transmission spindles with which said registering wheels are normally coupled so as to be rotated thereby, a main shaft, a set of primary calculating disks thereon each provided on one of their faces with laterally projecting and radially extending counting-teeth progressively shortened in length but with their outer ends alined in the same arc, transmission shafts, secondary calculating wheels having eight peripheral teeth mounted on said transmission shafts so as to rotate the same, said secondary calculating wheels being rotatable in a plane at right angles to said primary calculating disks, said secondary calculating wheels being movable on their transmission shafts relative to said counting-teeth so as to be engaged and operated by one or more of the same, and a four to five ratio transmission gearing between said transmission shafts and said transmission spindles.

2. A calculating machine, comprising a registering mechanism including a main shaft, a set of primary calculating disks on said main shaft provided on their opposite faces with sets of laterally projecting and radially extending counting-teeth progressively shortened in length but with their outer ends alined in the same arc, transverse transmission shafts, secondary calculating wheels mounted on said transmission shafts so as to rotate the same, said secondary calculating wheels being movable relative to said counting-teeth so as to be engaged and operated by one or more of the same, and means for shifting said main shaft longitudinally to shift said primary calculating disks so that the counting-teeth on one face or the other of said disks are positioned operatively relative to said secondary calculating wheels to rotate the latter in one direction or the other for the purposes specified.

3. A calculating machine, comprising a set of numeral or registering wheels having a decimal movement, transmission spindles with which said registering wheels are normally coupled, a main shaft, a set of primary calculating disks thereon provided on their opposite faces with series of laterally projecting and radially extending counting-teeth progressively shortened in length but with their outer ends alined in the same arc, transmission shafts, secondary calculating wheels having eight teeth mounted on said transmission shafts so as to be capable of a longitudinal movement thereon, and thus adapted to be positioned to be engaged and operated by one or more of said counting-teeth, said secondary calculating wheels rotating in a plane at right angles to said primary calculating disks, means for shifting said main shaft longitudinally to shift said primary calculating disks so that the counting-teeth on one face or the other of said disks are positioned operatively relative to said secondary calculating wheels to rotate the latter in one direction or the other for the purposes specified, and a four to five ratio transmission gearing between said transmission shafts and said transmission spindles.

4. A calculating machine, comprising a set of numeral or registering wheels, a set of primary calculating disks each provided on one of their faces with a series of laterally projecting radially extending counting-teeth progressively shortened in length but with their outer ends alined in the same arc, and a carrying-tooth projecting laterally from each primary calculating disk, transmission shafts, secondary calculating wheels mounted on said transmission shafts to rotate the same, said secondary calculating wheels being movable on their transmission shafts relative to said counting-teeth so as to be engaged and operated by one or more of the same, transmission means between said transmission shafts and said registering wheels, a carrying-wheel slidably mounted on each transmission shaft, a set of bell-crank levers, one arm of each extending beneath a registering wheel from which the digit is to be carried and the other arm of each being connected with the carrying wheel of the next adjacent transmission shaft which operates the registering-wheel to which the digit is to be carried, a trip-nosing on each registering wheel for operating said bell-crank levers for the purposes specified, and means on said primary calculating disks for returning said carrying wheels to normal initial position.

5. A calculating machine, comprising a set of numeral or registering wheels mounted in a movable carriage, a main shaft mounted in a casing, a plurality of primary calculating disks on said shaft provided on their opposite faces with series of counting-teeth, transmission shafts, eight toothed secondary calculating wheels mounted on said transmission shafts to rotate the latter, means for selectively positioning said secondary calculating wheels so that the same may be engaged and operated by one or more counting-teeth, means for shifting said main shaft longitudinally to operatively relate said primary calculating disks to one side or the other of said secondary calculating wheels to turn the same in the desired direction for multiplication or division, transmission spindles, coupling means for selectively coupling said registering wheels therewith according to the position of said carriage, a four to five transmission gearing between said transmission shafts and said transmission spindles, a carrying tooth on each face of said primary calculating disks, a carrying wheel on each transmission shaft, a trip-nosing on each registering wheel, means operated by said trip-nosing for shifting the carrying wheel of the next adjacent transmission shaft in the path of a carrying tooth of a primary calculating disk, and means on said primary calculating disks for returning said carrying wheels to normal initial position.

6. In a calculating machine, a main shaft, primary calculating disks having counting teeth mounted on said main shaft, a crank-means for rotating said main shaft, secondary calculating wheels adapted to be moved laterally relative to the faces of said primary calculating disks to be positioned so as to be operated by one or more of said counting-teeth, transverse spring actuated slide-bars connected with said secondary calculating wheels to control the lateral positioning movement thereof, a bank of keys for each slide-bar, stop means connected with each slide-bar and coöperating with each key, means for locking said slide-bars in normal position, means carried by each key for releasing said slide-bars when a key is depressed, means for locking said keys in depressed position, means capable of independent operation for simultaneously releasing said key locking means and for retracting said slide-bars to normal positions, and means operated by said crank-means for automatically and simultaneously operating all of said releasing and retracting means at the end of each revolution of said main shaft and its crank-means.

7. In a calculating machine a calculating mechanism, transverse spring-actuated slide-bars for setting said calculating mechanism, a bank of keys for each slide-bar the depression of which is adapted to initiate and limit the movement of said slide-bars, and means for retracting said slide-bars to normal position, comprising a fulcrum shaft, retracting levers pivoted on said fulcrum shaft so as to be capable of independent oscillation thereon, a pin or projection on each slide-bar adapted to receive the retracting impulse of said retracting-levers, each retracting lever being provided in its hub with a female clutch portion, male clutch portions fixed on said fulcrum shaft and coöperating with said female clutch portions of said retracting levers, and manually operated means for oscillating said fulcrum shaft whereby all of said retracting-levers are simultaneously operated.

8. In a calculating machine a calculating mechanism including a main shaft for actuating the same, transverse spring-actuated slide-bars for setting said calculating mechanism, a bank of keys for each slide-bar the depression of which is adapted to initiate and limit the movement of said slide-bars, pivoted spring-actuated locking-bars for locking said keys in depressed position, and means for simultaneously releasing said locking-bars and retracting said slide-bars to normal initial position, comprising a fulcrum shaft, retracting levers, the hubs of which are pivoted on said fulcrum shaft, a releasing arm extending from the hub of each retracting-lever adapted to engage said locking-bars to swing the same from locking position, each retracting-lever and its releasing arm being capable of independent oscillation, a pin or projection on each slide-bar adapted to be engaged by said retracting-levers, a female clutch-portion in the hub of each retracting-lever, male clutch portions fixed on said fulcrum-shaft and coöperating with said female clutch portions of said retracting levers, manually operated means for oscillating said fulcrum-shaft whereby all of said retracting-levers and releasing arms are simultaneously operated, and alternative means for automatically oscillating said fulcrum-shaft for said purposes at the end of each rotation of said main shaft.

9. In a calculating machine, a calculating mechanism including a main shaft, primary calculating-members mounted thereon, secondary calculating members actuated by said primary members, numeral or registering wheels, transmission means between said secondary calculating members and said registering wheels, a second set of numeral or registering wheels for recording the number of revolutions of said main shaft and its primary members, a crank-means for rotating said main shaft, a gear-wheel for rotating said second registering wheels, a reciprocating means operated by said crank-means, a spring controlled pawl carried by said reciprocating means and adapted upon the operation of the latter to engage said gear-wheel to produce intermittent rotary movements of the same at each revolution of said crank-means and said main-shaft.

10. In a calculating machine, a calculating mechanism including a main shaft, primary calculating-members mounted thereon, secondary calculating members actuated by said primary members, numeral or registering wheels, transmission means between said secondary calculating members and said registering wheels, a second set of numeral or registering wheels for recording the number of revolutions of said main shaft and its primary members, a crank-means for rotating said main shaft, a gear-wheel for rotating said second registering wheels, a reciprocating means operated by said crank-means, and oppositely directed spring controlled pawls respectively mounted on opposite faces of said reciprocating means, means for shifting said reciprocating means laterally to engage one or the other of said pawls operatively with said gear wheel according to the character of calculating operations whether that of multiplication or division, and a crank-pin and connecting rod means driven by said crank-means for operating said reciprocating means, substantially as and for the purposes set forth.

In testimony, that we claim the invention set forth above we have hereunto set our hands this 18th day of February, 1915.

FRANK S. BALDWIN.
GEORGE H. BALDWIN.

Witnesses:
George D. Richards,
Fred'k H. W. Fraentzel.